United States Patent
Hill

[19]

[11] Patent Number: 5,942,830
[45] Date of Patent: Aug. 24, 1999

[54] THREE-PHASE ELECTRIC MACHINE WITH INTERLACED CONDUCTOR LAYERS

[76] Inventor: Wolfgang Hill, Ortenbergstrasse 3, D-76135 Karlsruhe, Germany

[21] Appl. No.: 08/720,782

[22] Filed: Oct. 3, 1996

Related U.S. Application Data

[63] Continuation of application No. PCT/DE95/00457, Apr. 5, 1995.

[51] Int. Cl.[6] .............................. H02K 3/00; H02K 3/04
[52] U.S. Cl. ....................... 310/179; 310/180; 310/201; 310/207
[58] Field of Search ................... 310/179, 180, 310/206, 207, 201, 198, 270, 268

[56] References Cited

U.S. PATENT DOCUMENTS

| | | | |
|---|---|---|---|
| 588,279 | 8/1897 | Lamme | 310/179 |
| 2,502,068 | 3/1950 | Anderson | 310/268 |
| 2,993,135 | 7/1961 | Henry-Baudot | 310/180 |
| 4,645,961 | 2/1987 | Malsky | 310/156 |
| 5,616,977 | 4/1997 | Hill | 310/179 |

FOREIGN PATENT DOCUMENTS

| | | | |
|---|---|---|---|
| 0 091 123 | 10/1983 | European Pat. Off. | 310/201 |
| U-9305152 | 7/1993 | Germany | 310/207 |
| 43 21 236 | 8/1994 | Germany | 310/207 |
| 888 515 | 1/1962 | United Kingdom | 310/201 |

OTHER PUBLICATIONS

A–93 03534 (Hill Wolfgang) Feb. 1993 PCT/DE92/00617.
A–86 03351 (Fanuc Ltd) Jun. 1986 PCT/JP85/00662.

*Primary Examiner*—Nestor Ramirez
*Assistant Examiner*—Karl Tamai

[57] ABSTRACT

In prior art three-phase electric machines with a layered winding, the conductor elements either make non-optimal use of the space in the groove or the conductors for each phase are in the form of large elements designed to be fitted into each other and whose manufacture is complicated and costly. The invention calls for the conductor lanes (5–7) for each phase in the three-phase conductor layer (11) to be identical in construction and for the construction to be repeated every four pole pitches. While the conductor lanes (5–7) occupy the full height of the layer within the magnetic field, two conductor lanes (5–7) stacked in the groove share the space at the winding ends (19). At the groove exit, the conductor cross-section increases and only later, at the winding end (19) is bisected from only one side at each passage through the winding end. In order to alternate the halves of the layer, contact surfaces are available which are large in comparison to the conductor cross-section and the two winding ends (19) are uniformly utilized due to the interlacing of the lanes. The production of three-phase conductor layers by alternating application of conducting and insulating layers is particularly suitable for small electromagnetic machines, resulting in uniform space utilization and hence high effectiveness and a high power density at low cost, and requiring only a few operations.

3 Claims, 3 Drawing Sheets

THREE-PHASE ELECTRIC MACHINE WITH INTERLACED CONDUCTOR LAYERS

BACKGROUND OF THE INVENTION

1. Field of the Invention

The invention concerns a three-phase electric machine with an interlaced winding as well as a production process which is a continuation of PCT/DE 95/00457, filed on Apr. 5, 1995, with priority of the German application DE 44 11 750.7, filed on Apr. 6, 1994.

2. Description of the Prior Art

From British patent 13 29 205 conductor lanes for linear machines are known which are manufactured as cast parts in a mould. Because the conductor parts are individually manufactured and then assembled, expensive moulds for prefabrication with low tolerances are required. Further, the height of said conductor parts decreases sharply at the end of the groove, thereby resulting in a small critical cross section. The conductor parts of all phases are stacked flat in the winding overhangs, thereby creating large voids and, in case of three-phase conductor layers, three partial layers in said winding overhangs.

The invention is, therefore, based on the objective to advance the development of a three-phase electric machine with a layered winding in which the conductor lanes of said winding are in part arranged in a soft magnetic body in such a manner that uniform utilization of space is achieved and manufacture is simplified.

SUMMARY OF THE INVENTION

The objectives are achieved in accordance with the invention by the characteristics of claim 1.

In accordance with the invention, the uniform utilization of space in a three-phase electric machine with a layered winding, the conductor lanes of said winding being arranged in a soft magnetic body and said conductor lanes of different phases being arranged within a conductor layer is achieved by arranging partial conductor sections of a conductor lane which are sequentially placed in direction of the progression within a winding overhang in layer halves of the conductor layer at different distances to the air gap and where all conductor lanes are of identical structural shape, as well as by manufacturing all three conductor lanes of a three-phase winding layer concurrently in one process by alternately applying layers of insulating material and conductor material.

All conductor lanes of a three-phase conductor layer are of identical structural shape, with the configuration of the conductor lanes repeating every four pole pitches and each conductor lane in this period possessing in both winding overhangs two partial conductor sections in two different halves of the layer. In the magnetic field, a conductor lane occupies always the entire height of the layer, thereby avoiding transitions between two halves of the layer within the pass-through through a winding overhang. However, the three-phase conductor layer consists in the winding overhangs of only two partial layers. Additionally, the winding overhangs are being completely and uniformly utilized, because in each half of the winding overhang partial sections of the conductor lanes are arranged tangentially in sequence and are separated only by thin insulating layers. A narrowing of the cross section at the transition of the winding overhang at the groove is avoided by initially enlarging the width of the conductor parallel to the groove width when said conductor is exiting the groove and by bisecting the conductor height farther within the winding overhang.

This optimal space utilization is possible for three-phase conductor lanes only then, if the three conductor lanes are interlaced, i.e. the conductor lanes of a layer can not be manufactured independently of each other but only in a common process. Besides welding of prefabricated parts in the groove area, processes in which conductor layers and insulation layers are alternately produced are suitable. Thick layer and thin layer techniques enable the fully automated manufacture of extremely flat mini and micro motors.

The drawings show advantageous embodiments of the invention.

DETAILED DESCRIPTION OF THE PREFERRED EMBODIMENT

Figure 1:
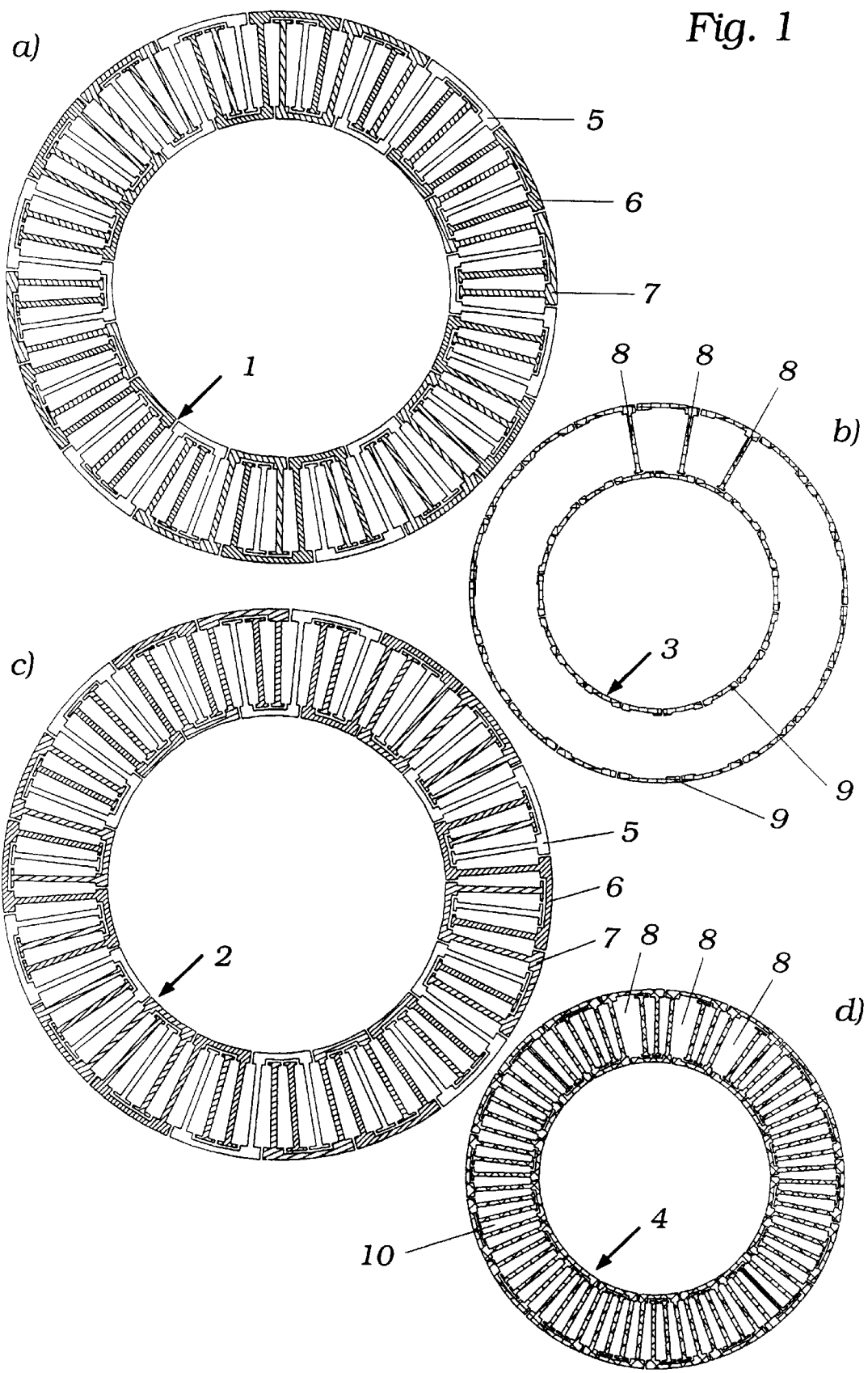
FIG. 1 shows the masks for the manufacture of the three-phase conductor layers.

FIG. 1 shows on the left side the two conductor masks (1, 2) and on the right, somewhat smaller, the insulation masks (3, 4) for a 24-pole, three-phase conductor layer. Material is applied on a flat surface, filling existing indentations in the process. After exposure with the respective mask (1–4), the non-hatched surfaces are removed again. The hatched surfaces of the conductor masks (1 and 2), therefore, represent parts of the three conductor lanes (5–7). In each half of each layer, only two different structural shapes occur which can be assigned to the respective phases on the basis of the different hatching. In the insulation mask (3) for the center of the layer insulation material remains only in the winding overhangs (9), except for the three partial sections (8) in which a change of the layer occurs. On the other hand, the lower insulation mask (4) separates two identical, three-phase conductor layers and therefore, insulation material remains on the surfaces, except in the transition areas (8). The openings (10) within the layers are intended for a magnetic conductive material—e.g. iron powder or ferrite.

Figure 2:
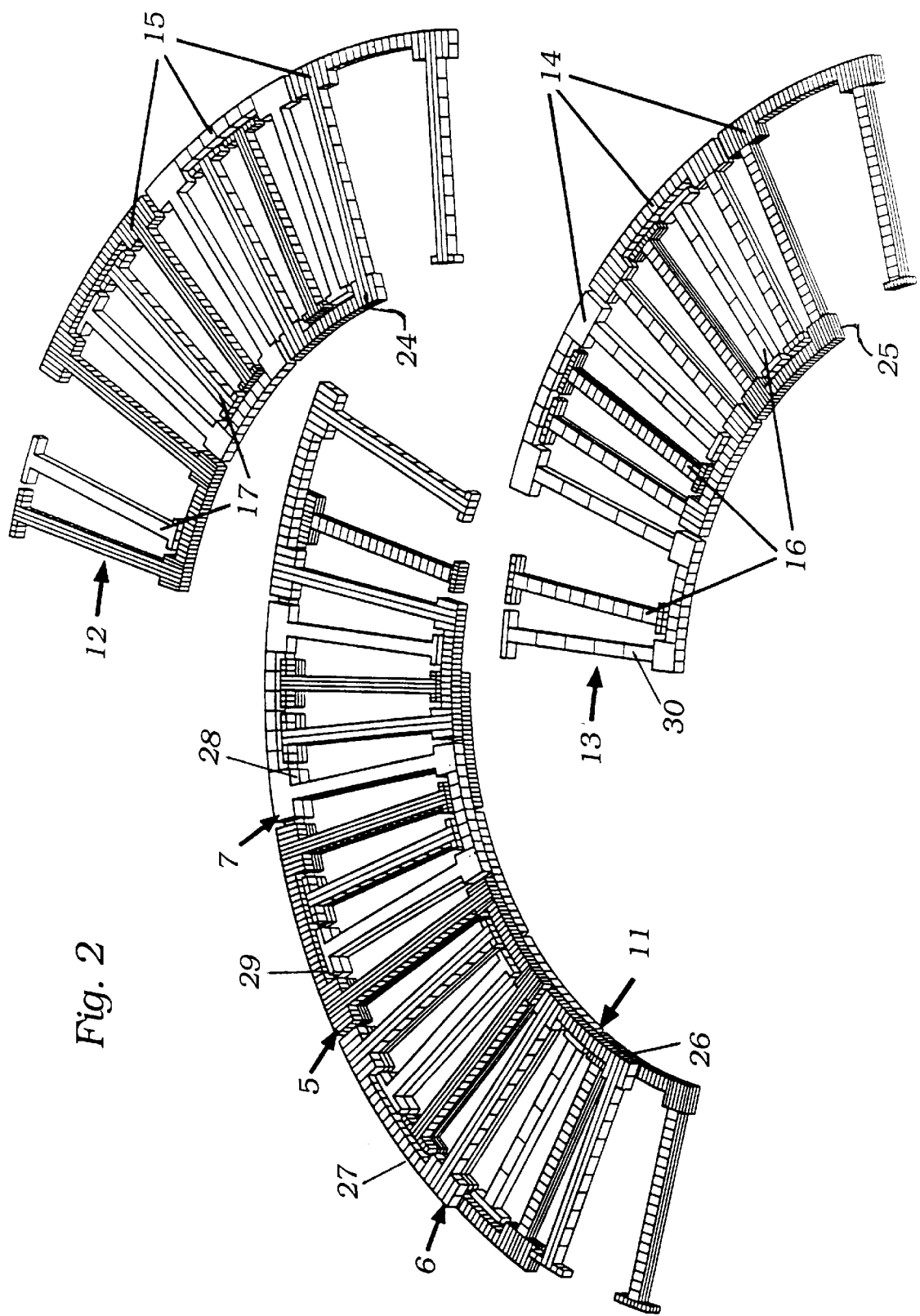
FIG. 2 shows the spatial construction of the conductor layers from FIG. 1.

FIG. 2 shows the construction of the three-phase interlaced conductor layer (11) from FIG. 1 in a spatial depiction of a section of the circumference in which the differently hatched conductor lanes (5–7) of the two halves of the layer (12, 13) are shown as being assembled from flat cuts of sheet metal. On the right side of the illustration, the two halves of the layer have been pulled apart parallel to the depth of the groove in order to better clarify their shape. Each of the three conductor lanes (5–7) consists of four differently arranged partial conductor sections (14–17) which together bridge four pole pitches and in which each of the small groove bar sections (16, 17) for the groove pass-through without change of the halves of the layers, as well as the large conductor sections (14, 15) are identical. Since the three conductor lanes are identical, the entire three-phase conductor layer (11) consists of only two different partial conductor sections.

Figure 3:
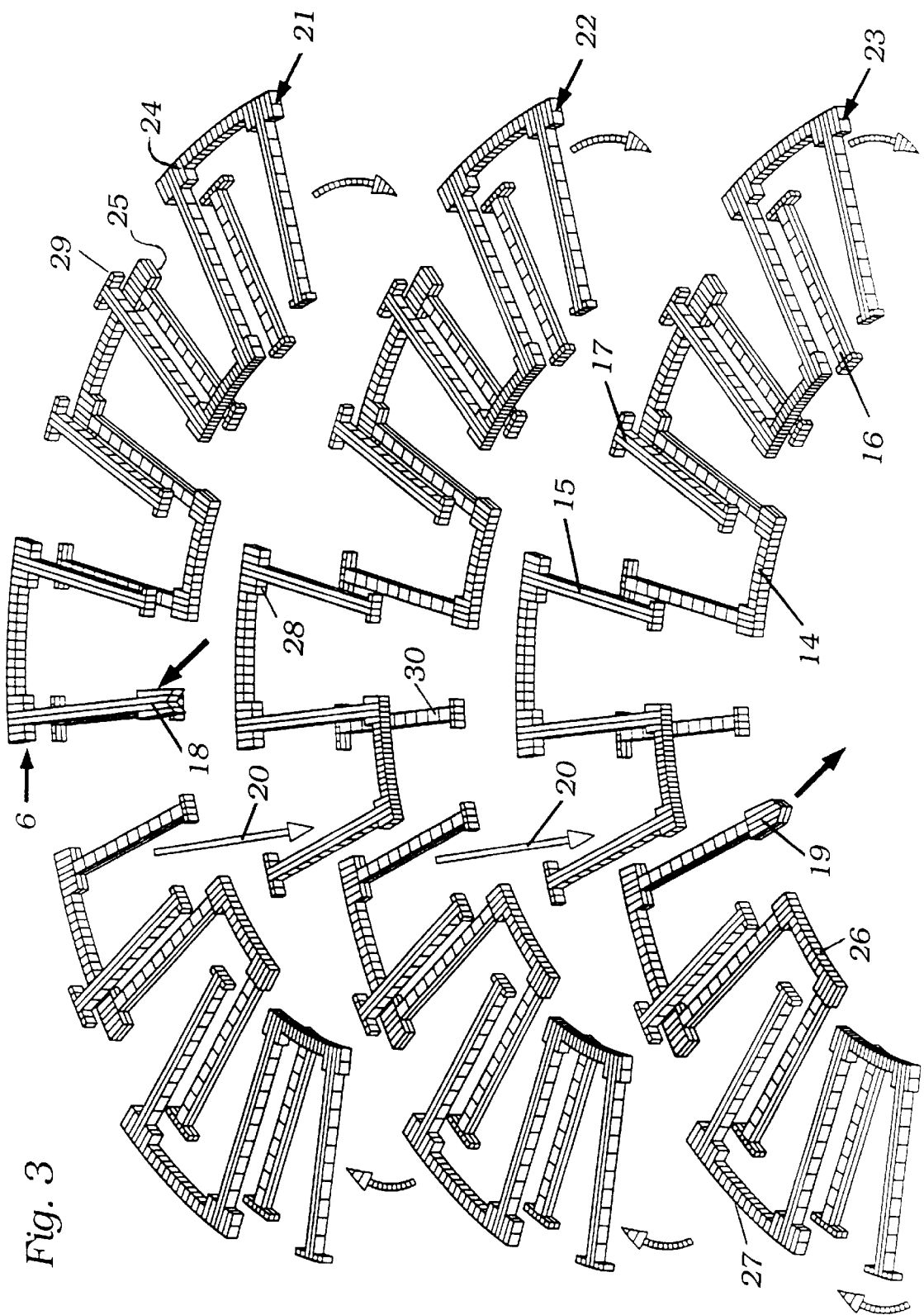
FIG. 3 shows the sequence of three sections of a conductor lane from FIG. 2, placed on top of each other.

In FIG. 3 the arrangement of the conductor lane (6) from FIG. 2 is shown in all layers (21–23) of a winding which consists of three layers. Here that section of the circumference was chosen in which the current supply and current derivation (18, 19) as well as the change to another layer (20) occur. Besides the two structural shapes (14, 15) and (16, 17) respectively, the winding contains only two additional shapes, (18 and 19). In the upper layer (21), the conductor lane progresses, beginning from the current supply (18), clockwise through the entire circumference of the machine minus one pole pitch. At the end, the last partial conductor section in the lower half of the layer is connected with the first partial conductor section in the upper half of the middle layer (22). After another complete progression through the circumference, the conductor lane changes in the transition groove to the lower layer (23), from which, after the third progression through the circumference, the current derivation (19) occurs again in the transition groove. The three transition grooves of the machine should be executed in a position that is lower than the other grooves by one half the thickness of a conductor layer in order to avoid a narrowing of the conductor cross section in the last partial conductor section (19).

In FIGS. 2 and 3, the surfaces shown in top view in FIGS. 1*a*) and 1*c*) are indicated by 24 and 25, where 24 indicates the upper surface of the upper half 12 of the layer 11 and 25 indicates the bottom surface of the lower half 13 of the layer 11. In the spatial representation, the surfaces 26 and 27 can be perceived which face radially inward 26 and outward 27. The openings 10 within the conductor layer are radially delimited by boundary surfaces 28. The left side of FIG. 2 shows how the differently hatched conductor lanes of the three-phase winding layer 11 yield to each other in the winding overhangs located radially within and outside the openings by decreasing their conductor height by one half and enlarging their width accordingly. The point where the conductor height is halved in a steplike configuration is indicated by 29. The arrow 29 points to the location of the unhatched conductor lane at which the conductor height is (axially) halved downward in order to proceed below the (radially) densely hatched conductor lane. The conductor lanes possess a constant width 30 between the openings 10 for the soft magnetic material. This width corresponds approximately to the width of the grooves (not shown).

I claim:

1. A three-phase electric machine with a layered winding, said layered winding containing conductor lanes, said conductor lanes being of three phases and being arranged within a winding layer, said winding layer having a height, said height being the distance between two large planes and said planes being bounded along their margins by peripheral surfaces, wherein said conductor lanes in said three-phase winding layer are of identical design, said conductor lanes form openings in said winding layer, said openings extend parallel through said winding layer height, said opening receive magnetic material, said conductor lanes contain internal and external sections, said external sections lie between said openings and said peripheral surfaces of said winding layer, said internal sections are arranged between two of said openings and have a width which is approximately equal to the distance between said openings, said external sections form winding overhangs wherein a thin insulation layer separates said winding overhang of said winding layer in partial areas into two halves of said winding layer parallel to said winding layer height, and said external sections of one of said conductor lanes are arranged sequentially parallel to said width of said internal sections within each of said winding overhangs in different halves of said winding layer.

2. A three-phase electric machine in accordance with claim 1, wherein said conductor lanes have a height, said height corresponds to said winding layer height in said internal sections, said conductor height corresponds to one half of said winding layer height in partial areas of said winding overhangs, said openings have a boundary to said external sections, said height of said conductor lanes changes in said winding overhangs, and said change of that height occurs at a distance to said boundary of said openings to said external sections that corresponds to approximately one half the width of said conductor lanes between two openings.

3. A three-phase electric machine in accordance with claim 1, wherein said conductor lanes of different said three-phase winding layers are connected wherein said winding layers are stacked parallel to said winding layer height and said connection occurs at locations of said conductor lanes which lie in said internal sections.

\* \* \* \* \*